(12) United States Patent
Moreton

(10) Patent No.: US 7,649,911 B2
(45) Date of Patent: Jan. 19, 2010

(54) METHOD OF DATA HANDLING IN A WLAN

(75) Inventor: Michael John V. Moreton, Wiltshire (GB)

(73) Assignee: Synad Technologies Limited, Berkshire (GB)

( * ) Notice: Subject to any disclaimer, the term of this patent is extended or adjusted under 35 U.S.C. 154(b) by 470 days.

(21) Appl. No.: 10/572,723

(22) PCT Filed: Sep. 22, 2004

(86) PCT No.: PCT/GB2004/004026

§ 371 (c)(1),
(2), (4) Date: Mar. 21, 2006

(87) PCT Pub. No.: WO2005/029774

PCT Pub. Date: Mar. 31, 2005

(65) Prior Publication Data

US 2006/0268881 A1 Nov. 30, 2006

(30) Foreign Application Priority Data

Sep. 22, 2003 (GB) ................................ 0322132.2

(51) Int. Cl.
*H04J 3/07* (2006.01)
*H04J 1/02* (2006.01)
*H04L 12/28* (2006.01)
*H04L 12/413* (2006.01)

(52) U.S. Cl. .................. 370/506; 370/349; 370/394; 370/445

(58) Field of Classification Search ............... 370/506, 370/349, 338, 462, 469, 336, 329, 394, 445
See application file for complete search history.

(56) References Cited

U.S. PATENT DOCUMENTS

| | | |
|---|---|---|
| 2002/0163933 A1 | 11/2002 | Benveniste |
| 2003/0133469 A1 | 7/2003 | Brockmann et al. |
| 2004/0071154 A1 | 4/2004 | Wentink |
| 2004/0085993 A1 | 5/2004 | Wentink |
| 2005/0147075 A1* | 7/2005 | Terry .......................... 370/338 |
| 2006/0050742 A1* | 3/2006 | Grandhi et al. ............. 370/506 |
| 2006/0056443 A1* | 3/2006 | Tao et al. .................... 370/462 |

OTHER PUBLICATIONS

PCT International Search Report, PCT/GB2004/004026, dated Apr. 1, 2005.

* cited by examiner

*Primary Examiner*—Melody Mehrpour
(74) *Attorney, Agent, or Firm*—Gardere Wynne Sewell LLP

(57) ABSTRACT

A method of handling data in a wireless LAN comprises contending for control of the medium using a CSMA/CA mechanism or the like. Once control has been established data is sent from the node which has established that control, to a second node. The acknowledgement of receipt issued by that second node in consequence is combined with a payload at that second node and which is intended to be sent to the first node anyway, and a single frame, with the payload piggy-backed onto the acknowledgement is returned to the first node. Bidirectional transmission of combined data and acknowledgement continues in a frame bursting manner until a time limit is reached or all data has been transmitted, whereafter contention commences again.

Figure 1:
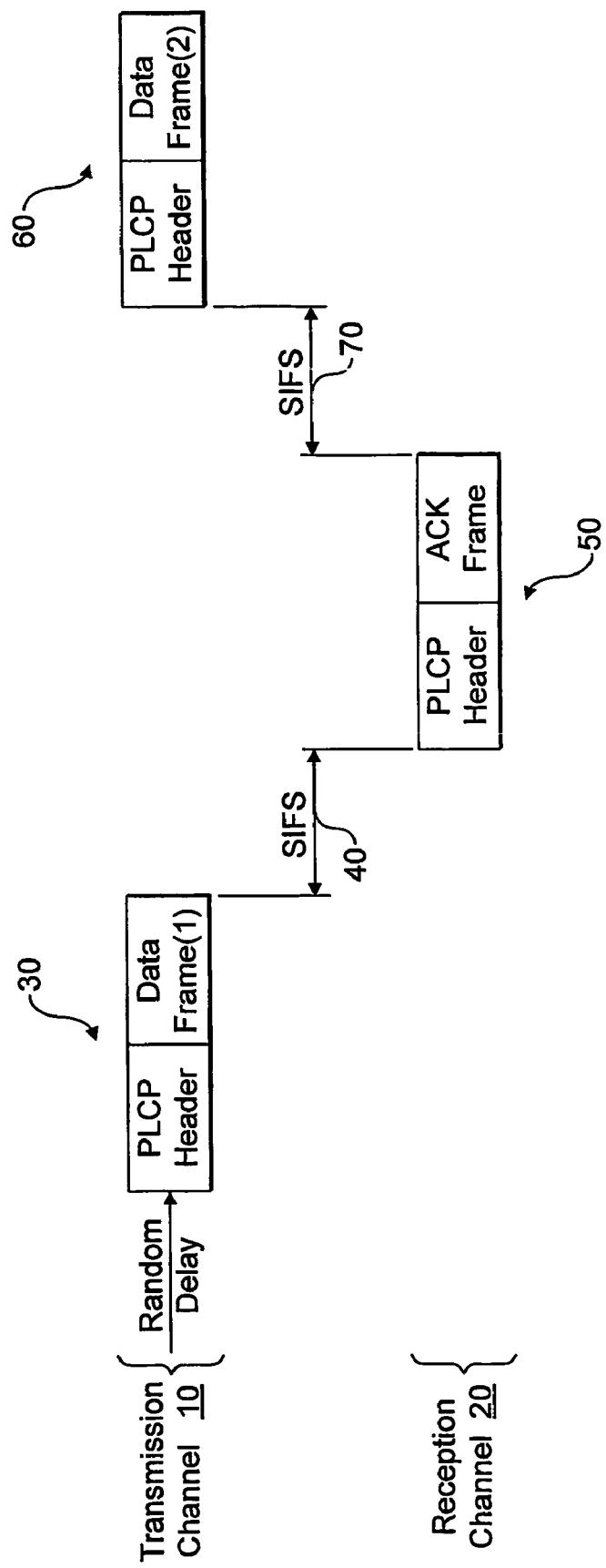

20 Claims, 2 Drawing Sheets

METHOD OF DATA HANDLING IN A WLAN

This invention relates to a modified method of data transmission and receipt acknowledgement in a Wireless Local Area Network (WLAN) and, in particular, to modifications to the manner of frame transmission and acknowledgement in the current IEEE 802.11 Standards, such as (but not limited to) 802.11e.

The IEEE 802.11 Standard specifies a Medium Access Control (MAC) layer which, amongst other functions, manages access to a medium (i.e., a shared radio channel) by nodes in the WLAN such as WLAN clients (often referred to as STAs) or access points (APs). The 802.11 MAC layer uses an 802.11 physical (PHY) layer such as 802.11a or 802.11b, to perform the tasks of carrier sending, transmission and receiving of 802.11 data.

Data in the 802.11 Standard is divided into frames, each of which contain, for example, timing and destination information in header portions (a MAC header and a PLCP header), along with a data payload. Before the frames are transmitted, a station wishing to transmit must first gain access to the (shared) medium. Two forms of medium access were defined in the original 802.11 Standard, Distributed Coordination Function (DCF) and Point Coordination Function (PCF). DCF is mandatory and is based upon a carrier sense multiple access with collision avoidance (CSMA/CA) protocol. With DCF, 802.11 stations contend for access and attempt to send frames when there is no other station transmitting. If another station is sending a frame, then stations wait until the channel is free.

PCF, by contrast, prioritises access to the medium via central control of an AP. A contention free period (CFP) is employed, wherein each STA in communication with the AP is kept quiet and the AP then polls each STA in turn to see if it has any data to send. In a separate contention period (CP), the STAs are able to contend for medium access in a manner identical to that employed in DCF. PCF was intended to be used when the data to be sent is bounded in time.

WLAN stations cannot simultaneously listen for collisions and transmit (mainly because a station's transmission would drown out the much weaker received signal). To address this, an acknowledgement (ACK) must be sent by the receiving station once it has received the transmitted frame without errors. The receiving station waits for a short period known as a Short Inter Frame Space (SIFS) before transmitting the ACK. The transmitting station assumes that there has been a collision (or RF interference) if an ACK is not received within a specified time.

There are a number of problems with the present arrangement. The medium is not used during the SIFS period which follows receipt of the data frame by a receiving station. The medium also cannot be used for data transfer during the subsequent ACK transmission period. Furthermore, the use of a random back-off timer (a feature of DCF and the CP of PCF), whilst reducing the number of collisions, does mean that random delays can constitute a significant proportion of the available transmission time, causing a reduction in transmission capacity.

To address the problem of delays caused by the random back-off timer, recent 802.11 implementations (such as, currently, 802.11e) have introduced a technique known as "frame bursting". This is illustrated in FIG. 1, which shows the transmission and reception channels 10, 20 of a first WLAN station, configured to process frames using frame bursting.

As is seen in FIG. 1, the first WLAN station gains control of the medium, using the contention mechanism described above, after a random time introduced by the random back-off timer. A first data frame 30 is then transmitted. After a SIFS 40, an acknowledgement frame 50 for a previously transmitted data frame (not shown) is received in the reception channel 20. However, in this burst mode, instead of waiting a random time before sending a next data frame, the station instead starts transmission of that next data frame 60 immediately after a further SIFS 70. The station thus retains control of the medium and other stations are in consequence prevented from starting transmissions until the burst has ended. The burst concludes when a maximum burst length is exceeded (to prevent one station from controlling the medium indefinitely) or when the transmitting station runs out of frames to send.

Frame bursting thus reduces the amount of random time periods introduced in order to prevent collisions, although of course, it does not dispense with them completely as a contention mechanism is still necessary to decide which station will next have control of the medium following completion of a previous burst. Two modes for controlling access to the medium are proposed in 802.11e, Enhanced DCF Channel Access (EDCA), which is an extension of DCF and Hybrid Coordination Function Controlled Channel Access (HCCA), which is an extension of PCF. DCF and PCF both treat all data equally such that low priority traffic could interrupt a critical real time data stream such as video. EDCA supports priority traffic by providing a prioritised Quality of Service (Qos) in which there is nevertheless an element of contention between nodes, whereas HCCA provides a parameterised QoS in which bandwidth is made available based upon strict reservation.

Frame bursting is a feature of both EDCA and HCCA (and in fact is also offered as an upgrade to DCF, even though it was not specified in the original standard). Although its use in a contentious environment such as is offered in EDCA and the "enhanced" DCF mentioned above provides for a greater data throughput as a result of fewer random back offs, it does still suffer from problems. In particular, a transmitting station often runs out of frames to send in a given burst because the majority of data sessions are to some extent bi-directional. In other words, in order for a transmitting station to continue to have transmittable frames, it must first have received return data (usually from the intended recipient station) in the reverse direction. As a result, frame bursts are often shorter than is desirable because the transmitting station runs out of frames to send.

The present invention is concerned with these and other problems with current WLAN protocols.

Against this background, there is provided a method of handling data packets in a Wireless Local Area Network (WLAN), comprising:

(a) contending for control of a medium over which data is to be transmitted, by a plurality of nodes in the network;

(b) when control of the medium has been established by a first node in the network, transmitting a first data packet from that first node, which has control of the medium, to a second node in the network;

(c) receiving, at that second node, the transmitted data packet;

(d) generating, at that second node, a combined data/acknowledgement packet which contains both an acknowledgement of receipt of the said first data packet by the said second node and also a second data packet intended for delivery to the said first node from the said second node; and (e) transmitting the said combined data/acknowledgement packet from the said second node to the said first node.

The bi-directional travel of data between nodes 1 and 2 is a result of piggybacking data frames onto ACK frames, and not a consequence of any fundamental alteration to the underlying contention mechanism proposed previously. In particular, even in the original DCF mechanism, contention for control did not commence (by way of a random back off time) until the cycle of transmission of data from A to B and subsequent transmission of an ACK from B to A in consequence had been completed. The present invention instead makes better use of the transmission of the ACK (which is necessary anyway) by piggybacking data onto that, resulting in more data being transmitted in a given time window than previously.

The invention is particularly applicable to Transport Control Protocol/Internet Protocol (TCP/IP) traffic on a network as TCP waits for the backwards flow of TCP acknowledgements before sending further data.

Figure 2:
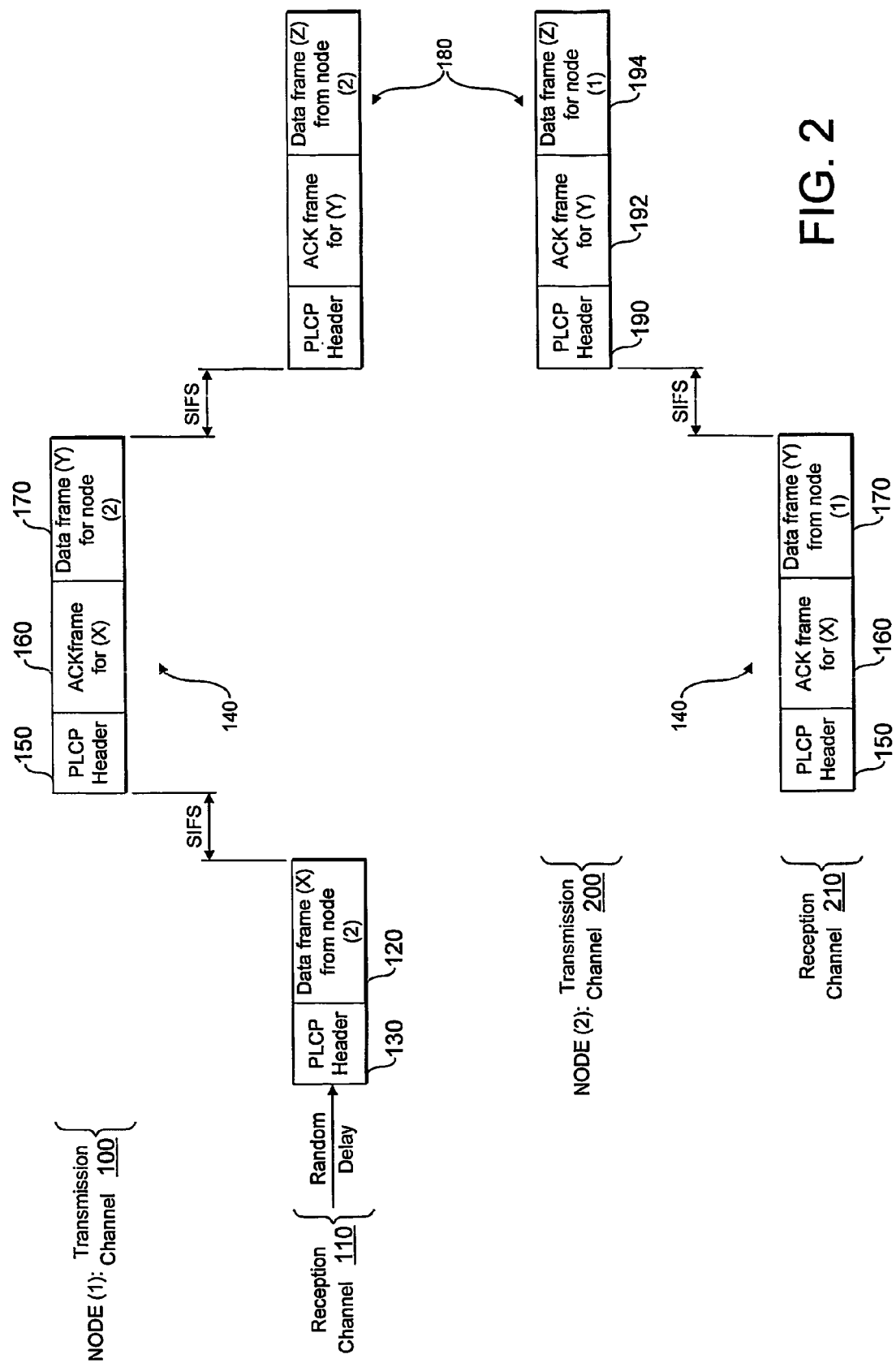

The present invention may be put into practice in a number of ways and one specific embodiment will now be described by way of example only and with reference to the accompanying Figures in which:

FIG. 1 shows how data is handled in the transmission and reception channels of a node in a wireless LAN, using conventional frame bursting techniques; and FIG. 2 shows, schematically, how data is handled by the transmission and reception channels of first and second nodes in a wireless LAN, in accordance with an embodiment of the present invention.

Referring to FIG. 2, the transmission channel 100 and reception channel 110 of a first node of a wireless LAN are shown schematically. FIG. 2 also shows a transmission channel 200 and a reception channel 210 of a second node in that wireless LAN. It will of course be understood that the WLAN will in practice have a potentially large number of nodes, some of which will be APs and some of which will be STAs. The present invention is intended for implementation particularly in the case where the nodes are operating in a mode where they each contend for access to the medium, but where, once control has been established by a particular node, multiple data frames are then sent. In the currently preferred embodiment, the nodes operate in EDCA mode with frame bursting but other modes are contemplated, such as, for example, "enhanced" DCF with frame bursting.

The two nodes in FIG. 2 (along with various other nodes not shown), as a rule) first contend for control of the medium in accordance with known techniques, such as CSMA/CA for example, as described above. For the purposes of illustration, consider the situation where node 2 in FIG. 2 gains access to the medium. As a first step, node 2 issues a "standard" 802.11 data frame 120 with a PLCP header 130 As will be seen in FIG. 2, the data frame received in the reception channel 110 from that second node is labelled data frame X.

Node 1, upon receipt of the data frame X 120 with its PLCP header 130 firstly checks to see whether node 2 has requested an acknowledgement of receipt of data frame X by node 1. Most, but not all, data frames in the 802.11 Standard do require acknowledgement of receipt because of the risk of non-delivery through collision or RF interference. In accordance with prior art protocols, the ACK frame would simply then be returned by node 1 to node 2. For example, if DCF were employed, the next step after return of the ACK frame would be to initiate contention for control of the medium once more, using the random back off timer described previously. With the addition of frame bursting (as with EDCA), after a SIFS, any additional available data frames at node 2 would instead be transmitted (again with a request for acknowledgement), and this procedure would continue until time out or until all of the data frames at that node had been sent.

In accordance with an embodiment of the present invention, however, once it has been determined that acknowledgement of receipt is required by node 2, node 1 next checks to see whether there are any data frames queued for transmission, and which are intended for delivery to node 2. If there are any such data frames, the "payload" data intended for transmission to node 2 is "piggybacked" onto the ACK that has to be sent anyway back to node 2 as a result of the latter's request for acknowledgement of receipt by node 1. Specifically, in the example of FIG. 2 the data frame labelled Y at node 1 and intended for transmission to node 2 is combined together with the acknowledgement for the data frame X 120 received from node 2. The PLCP header of data frame Y (which would, in the prior art, be a header to data frame Y) is not required; addressing and other details are included in the PLCP header of the ACK frame instead. Thus, a single, combined frame 140 is prepared for transmission by node 1. The combined frame 140 comprises a PLCP header 150, an acknowledgement frame 160 which acknowledges receipt of data frame X 120 from node 2, and a data frame Y 170 which is intended for delivery to the second node. This is transmitted from node 1 after a SIFS following receipt of the data frame X 120 with PLCP header 130.

There are a number of ways in which the combined data and ACK frame can be generated. One option is to combine together (concatenate) a data payload intended for transmission to a given node with an ACK frame going back to that node anyway. A slightly different scheme involves modifying the type field of a data frame. Specifically, when a data frame is identified that is to be sent to a particular node, and where that node is awaiting an acknowledgement of receipt of an earlier data frame sent in the opposite direction, instead of stripping out the headers from the data frame and combining the payload with an ACK frame, the frame type of the data frame can instead be altered. For example, if the data frame header initially indicates a "data" content, it may instead be altered when an ACK is to be sent as well, to indicate "data+ACK". The end result is of course similar whichever approach is taken (adding a data payload onto an ACK frame or modifying the header of a data frame to indicate that it is a special ACK frame with data added as well)—indeed, this combined data and ACK frame is typically externally indistinguishable whichever way it is generated.

The combined frame 140 is transmitted across the network and is received in the reception channel 210 of node 2. Node 2 recognizes that the frame 140 is a combined frame (that is, a frame containing both an acknowledgement for data frame X and also data frame Y 170, either because the length of combined frame 140 is larger than that for a standard ACK frame in the 802.11 Standard, or because the header is different (such as the "data+ACK" header described above). Once the frame 140 has been recognized as a combined frame, the acknowledgement information from acknowledgement frame 160 can be extracted and handled in the usual manner, and data frame Y 170 can likewise be extracted from the combined frame 140 again for onward passage in the usual manner.

Since most data frames require acknowledgement, node 1 will in turn probably require acknowledgement of receipt of data frame Y when it has been received by node 2. In this case, the procedure described above is repeated, without allowing other nodes to contend for medium access (as would have been the case with DCF). In other words, once node 2 has determined that an acknowledgement of receipt for data frame Y is necessary, it checks to see whether there are any queued data frames which need to be sent in the opposite direction, that is, back to node 1. When such a data frame, which for example is labelled data frame Z, is located in the queue at node 2, it is once again combined with the acknowledgement for data frame Y so as to produce a second combined frame 180 made up of a PLCP header 190, an acknowledgement for data frame Y received from node 1, and data frame Z 194 intended for transmission back to node 1. This further combined frame 180 is transmitted from node 2 after a SIFS and is received in the reception channel 110 of node 1.

The procedure is thus analogous to the frame bursting technique developed for the 802.11e protocol, in that contention for medium control does not commence after a single data transmission and acknowledgement, but (at least potentially) after a string of data frames has instead been transmitted. Data and acknowledgement frames continue to be exchanged between nodes 1 and 2 until there are no further data frames queued, or until a maximum burst length is reached.

It will be understood that, throughout this procedure, node 2 remains in control of the medium. The bi-directional travel of data between nodes 1 and 2 in the example given is a result of piggybacking data frames onto ACK frames, and not a consequence of any fundamental alteration to the underlying contention mechanism. In particular, even in the original DCF mechanism, contention for control did not commence (by way of a random back off time) until the cycle of transmission of data from A to B and subsequent transmission of an ACK from B to A in consequence had been completed. The present invention instead makes better use of the transmission of the ACK (which is necessary anyway) by piggybacking data onto that, resulting in more data being transmitted in a given time window than previously. It will further be understood that the use of frame bursting changes the relatively small time saving when used with the basic DCF mechanism (equivalent to one contention) to a potentially much larger time saving since multiple bidirectional data transmissions can occur within a single frame burst.

The invention claimed is:

1. A method of handling data packets in a Wireless Local Area Network (WLAN), comprising:
   (a) contending by a plurality of nodes in the network for control of a medium over which data is to be transmitted;
   (b) establishing control of the medium by a first node of the plurality of nodes in the network by said contention in step (a), and while the first node has contention control of the medium, transmitting a first data packet from that first node to a second node of the plurality of nodes in the network;
   (c) receiving the transmitted first data packet at the second node while the first node remains in contention control of the medium;
   (d) generating a combined data/acknowledgement packet by the second node in response to the first data packet which contains both an acknowledgement of receipt of the first data packet by the second node and also a second data packet intended for delivery to the first node from the second node; and
   (e) transmitting the combined data/acknowledgement packet from the second node to the first node while the first node remains in contention control of the medium.

2. The method of claim 1, further comprising:
   (f) receiving, at the first node, the combined data/acknowledgement packet;
   (g) generating a further combined data/acknowledgement packet by the first node in response to the second data packet which contains both an acknowledgement of receipt of the second data packet by the first node and a third data packet intended for delivery to the second node from the first node; and
   (h) transmitting the further combined data/acknowledgement packet from the first node to the second node while the first node remains in contention control of the medium.

3. The method of claim 2, further comprising:
   (i) receiving at the second node, the further combined data/acknowledgement packet;
   j) generating a still further combined data/acknowledgement packet by the second node which contains both an acknowledgement of receipt of the third data packet by the second node and a fourth data packet intended for delivery to the first node from the second node; and
   (k) transmitting the still further combined data/acknowledgement packet from the second node to the first node while the first node remains in contention control of the medium.

4. The method of claim 3, further comprising: iteratively repeating steps (f) to (h) for each of the fifth, sixth, seventh, . . . nth data packets.

5. The method of claim 4, wherein the iterative repetition terminates when either a maximum time of medium control by the first node is reached, or when there are no further data packets to be transmitted.

6. The method of claim 1, wherein the step (a) of contending for control of the medium is carried out in accordance with carrier sense multiple access with collision avoidance (CSMA/CA).

7. The method of claim 6, wherein the step (a) of contention for control of the medium is in accordance with Enhanced Distributed Coordination Function Channel Access (EDCA).

8. The method of claim 2, further comprising, following receipt of the, or the further, data/acknowledgement packet, the step of extracting, from that data/acknowledgement packet, the data contained therein, and extracting the acknowledgement therefrom as well.

9. The method of claim 8, wherein the step of extracting are carried out when it is determined by the receiving node either that the received packet is longer than an acknowledgement of receipt alone, or that the received packet has a header which indicates that both data and acknowledgement are contained therein.

10. The method of claim 1 wherein the step of generating a combined data/acknowledgement packet comprises either concatenating an IEEE 802.11 ACK frame with a data payload, or comprises altering a header to an IEEE 802.11 data frame to indicate that the frame carries both a data payload and an acknowledgement of receipt.

11. A method, comprising:
   contending by a first node for access to a medium for transmission of a first packet to a second node;
   granting the first node contention access control over the medium;
   communicating the first packet over the medium to the second node during the contention access control granted to the first node;
   receiving the first packet by the second node; and
   sending a second packet by the second node over the medium to the first node while the first node retains contention access control over the medium, the second packet comprising a combined data/acknowledgement packet which contains both an acknowledgement of receipt of the first packet by the second node and also data intended for delivery to the first node.

12. The method of claim 11, further comprising:
receiving the combined data/acknowledgement packet by the first node; and
sending a third packet by the first node over the medium to the second node while the first node retains contention access control over the medium, the third packet comprising a further combined data/acknowledgement packet which contains both an acknowledgement of receipt of the second packet by the first node and also data intended for delivery to the second node.

13. The method of claim 11, wherein contending comprises contending for access in accordance with carrier sense multiple access with collision avoidance (CSMA/CA) protocol.

14. The method of claim 11, wherein contending comprises contending for access in accordance with Enhanced Distributed Coordination Function Channel Access (EDCA) protocol.

15. The method of claim 11 wherein the combined data/acknowledgement packet is an ACK frame concatenated with a data payload.

16. The method of claim 11 wherein the combined data/acknowledgement packet is a data frame having a header altered to indicate that the frame carries both a data payload and an acknowledgement of receipt.

17. A method, comprising:
engaging by a first node in a contention mode access process with respect to a shared communications medium;
receiving by the first node of a granted contention control of the communications medium;
communicating a first packet over the communications medium to a second node during the granted contention control given to the first node;
retaining by the first node the granted contention access control of the communications medium;
receiving the first packet by the second node; and
communicating by the second node a second packet over the communications medium over the medium while the first node retains granted contention access control of the communications medium, the second packet comprising a combined data/acknowledgement packet which contains both an acknowledgement of receipt of the first packet by the second node and also data intended for delivery to the first node.

18. The method of claim 17, wherein engaging comprises contending for access in accordance with carrier sense multiple access with collision avoidance (CSMA/CA) protocol.

19. The method of claim 17, wherein engaging comprises contending for access in accordance with Enhanced Distributed Coordination Function Channel Access (EDCA) protocol.

20. The method of claim 17 further comprising exchanging combined data/acknowledgement packets between the first and second nodes during the granted contention access given to the first node until a maximum time of the granted contention access given to the first node expires.

* * * * *

UNITED STATES PATENT AND TRADEMARK OFFICE
CERTIFICATE OF CORRECTION

PATENT NO. : 7,649,911 B2  Page 1 of 1
APPLICATION NO. : 10/572723
DATED : January 19, 2010
INVENTOR(S) : Michael John V. Moreton It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Twenty-third Day of November, 2010

David J. Kappos
*Director of the United States Patent and Trademark Office*